Feb. 20, 1962  B. E. EWING  3,021,642
LAWN MOWER ATTACHMENT FOR DISTRIBUTING LIQUID
Filed Oct. 22, 1959

INVENTOR.
BERNARD E. EWING,
BY
Schley, Trask & Jenkins
ATTORNEYS.

3,021,642
LAWN MOWER ATTACHMENT FOR DISTRIBUTING LIQUID
Bernard E. Ewing, 1717 S. Arlington, Indianapolis, Ind.
Filed Oct. 22, 1959, Ser. No. 848,150
3 Claims. (Cl. 47—1.5)

This invention relates to a lawn-mower attachment through the use of which liquid material may be distributed on the surface as the lawn is mowed. The liquid materials which can so be distributed include weed killers, insecticides, and fertilizers.

I am aware that it has heretofore been proposed to apply to a lawn mower an attachment intended to distribute liquid materials on the surface of the lawn as the mower passes over it; but such prior attachments of which I am aware have not proven entirely satisfactory largely because they were subject to failures which interfered with the desired uniform distribution of the liquid laterally of the path of lawn-mower travel. Such failures usually result either from the clogging of small liquid-distributing orifices or from differences in hydrostatic head resulting from the disposition of the lawn mower on a laterally sloping bank. It is therefore an object of this invention to produce a liquid-spreading attachment for lawn mowers which will possess an improved reliability in respect to the spreading of the liquid uniformly over the path of lawn mower travel. Another object of the invention is to produce a device which can be simply and economically manufactured in various sizes and which can be applied to lawn mowers, particularly rotary lawn mowers, of a wide variety of styles.

In carrying out my invention in its preferred form, I employ a distributor in the form of an elongated tube equipped with means for mounting it at the rear of a lawn mower in a horizontal position extending transversely of the path of lawn mower travel. At its bottom, such tube is provided with an elongated slot of substantial width, and in this slot there is disposed a spreader of a type which will feed and distribute the liquid by capillary attraction. Thick felt or wicking are suitable materials for the spreader, which depends from the tube far enough to rub over the surface of the lawn cut by the mower. The desired liquid is fed to the interior of the tube through an appropriate control valve from an elevated tank carried by the lawn mower. Desirably, such a tank is formed of flexible material which can collapse as liquid is fed from it.

Figure 1:
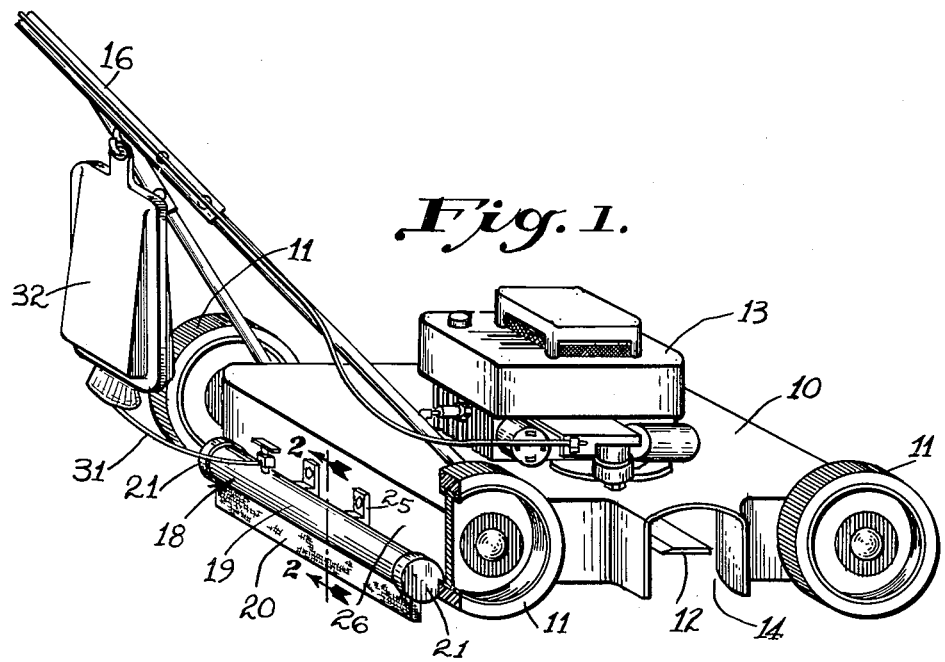
Figure 2:
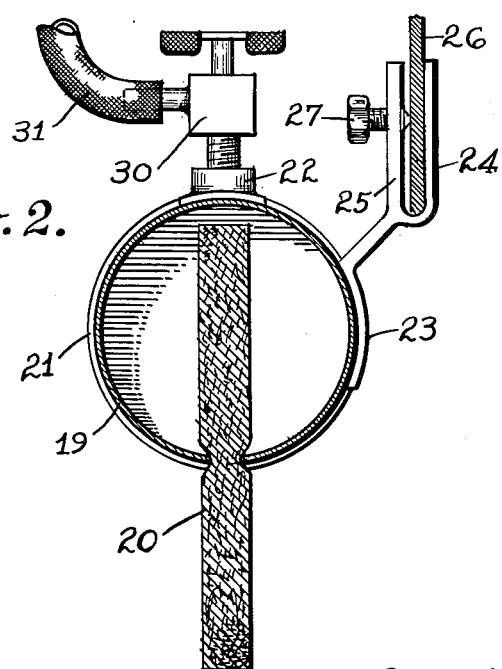

Other objects and features of the invention will become apparent from the following more detailed description and from the accompanying drawing, in which:

FIG. 1 is an isometric view of a lawn mower with an attachment embodying my invention applied thereto; and FIG. 2 is a vertical section approximately on the line 2—2 of FIG. 1.

The lawn mower shown in the drawing is of the rotary type having a housing 10 supported on wheels 11 and enclosing a blade 12 driven by an engine 13 mounted on the housing. One side of the housing is provided with an opening 14 through which the grass cuttings are discharged. The lawn mower is shown as provided with the customary handle 16 extending upwardly and rearwardly from the housing 10.

A device embodying my invention includes a distributor designated in its entirety by the reference numeral 18 and comprising an elongated reservoir 19 having a slot extending longitudinally along its bottom. Received in said slot and projecting both into the reservoir and downwardly therefrom is a sheet-like wick 20, formed of felt, wicking, or like material capable of feeding liquid by capillary attraction. Conveniently, the reservoir is formed of a length of sheet metal rolled into a general tubular form to leave its side edges spaced apart to provide a slot having a width such that the wick 20 may readily be passed through it, the wick is positioned in the slot, the tube is further collapsed to cause the sides of the slot to pinch the wick between them, and the ends of the tube are closed by caps 21.

An inlet fitting 22, desirably internally threaded, is secured to the reservoir 19 at an intermediate point opposite the slot. Also secured to the reservoir is means for mounting it on a lawn mower. As shown, such means comprises a pair of brackets 23 each bifurcated at its upper end to provide two opposed fingers adapted to receive between them the lower edge of the rear wall 26 of the mower housing 10. A set screw 27 mounted on one of the fingers 24 and 25 may be employed, in cooperation with the other finger, to clamp each bracket to the rear housing wall 26 as shown in FIG. 2. By disposing the brackets 23 near the midpoint of the reservoir 19, the distributor can be clamped to a housing which has either a plane rear wall as illustrated or a rear wall which is curved in horizontal plan.

In order to feed liquid to the reservoir 19 at a controlled rate, the inlet fitting 22 may receive a valve 30 connected through a flexible hose 31 to a liquid container 32 supported on the lawn mower above the reservoir 19 so that liquid in the container can feed to the reservoir under the influence of gravity. Conveniently, the container 32 is sealed at its top and is formed with flexible side walls capable of collapsing under the influence of atmospheric pressure as the liquid in the container is fed therefrom. A conventional rubber hot-water bottle makes a suitable container. I have found that a flexible-walled container sealed at its top provides a rate of liquid-flow which is relatively constant as the container empties. This may be due to the fact that, with the top of the container sealed, the escape of liquid from the container tends to create a vacuum therein, thus causing the flexible sides of the container to collapse under atmospheric pressure and raise the liquid level to a point above what it would be if the container had rigid walls.

In FIG. 2, I have shown the wick 20 as projecting almost entirely across the interior of the reservoir. This enables the user to pull the wick from the reservoir from the slot in the bottom thereof as may be necessary to maintain the lower edge of the wick at the proper elevation in spite of any wear that might occur.

In applying the attachment to the lawn mower, it is so positioned that the lower edge of the wick 20 will rub on the cut grass as the mower proceeds over the lawn. Since the cuttings from the mower are thrown laterally through the opening 14, the lower edge of the wick rubs directly on the grass behind the mower, and the liquid in the wick is wiped onto the still standing vegetation. Liquid so wiped from the wick is replaced with liquid feed from the reservoir 19 by capillary action and the force of gravity.

I claim as my invention:

1. In combination with a lawn mower, an elongated liquid reservoir mounted on the lawn mower and extending transversely thereof, said reservoir being provided along its bottom with a longitudinal slot having a length substantially equal to the effective width of the lawn mower, a sheet-like wick extending through said slot and projecting both into the reservoir and downwardly therefrom for a distance equal to at least several times the thickness the downwardly projecting portion of the wick for contact with the lawn, and means for feeding liquid to the reservoir at a controlled rate.

2. The invention of claim 1 with the addition that said wick has a normal thickness greater than the width of the slot and is compressed between the opposite side edges thereof.

3. The invention of claim 1 with the addition that said feeding means includes a liquid container connected to said reservoir and mounted on the lawn mower in a position above the reservoir so that liquid in the container can feed to the reservoir by gravity, said container being sealed above the level of the liquid therein and having flexible side walls capable of collapsing under the influence of atmospheric pressure as the quantity of liquid in the container decreases.

References Cited in the file of this patent

UNITED STATES PATENTS

| | | |
|---|---|---|
| 847,486 | Mable | Mar. 19, 1907 |
| 1,389,772 | Miller | Sept. 26, 1921 |
| 1,710,079 | Shapiro | Apr. 23, 1929 |
| 1,764,952 | Hay | June 17, 1930 |

FOREIGN PATENTS

| | | |
|---|---|---|
| 114,164 | Australia | Nov. 13, 1941 |
| 299,562 | Great Britain | Nov. 1, 1928 |